Jan. 6, 1942.  E. BECKER  2,268,636
MEANS FOR CONNECTING METAL SHEETS
Filed April 26, 1939  2 Sheets-Sheet 1
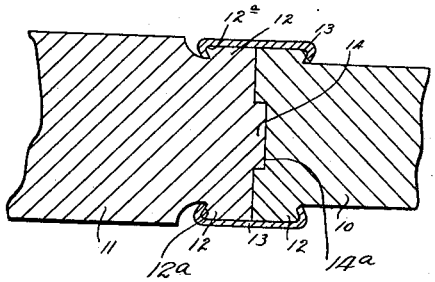
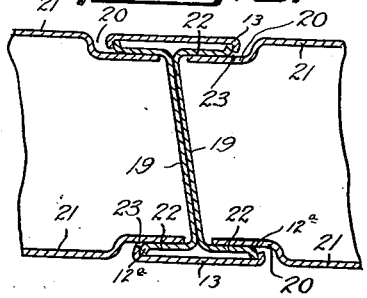
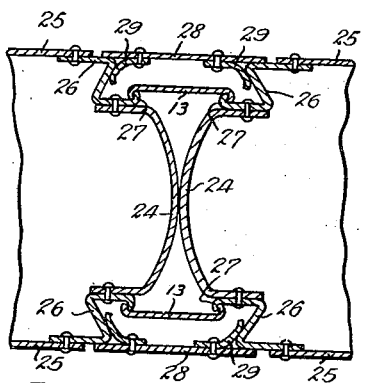
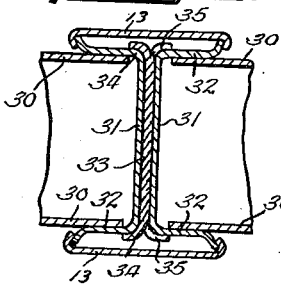
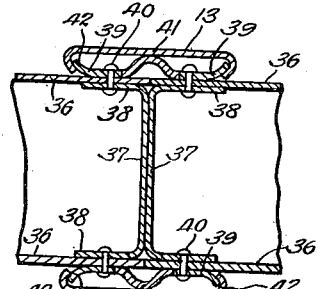
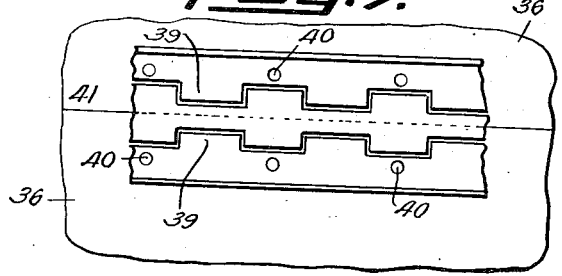
INVENTOR
EMIL BECKER
ATTORNEYS.

Jan. 6, 1942. E. BECKER 2,268,636
MEANS FOR CONNECTING METAL SHEETS
Filed April 26, 1939 2 Sheets-Sheet 2
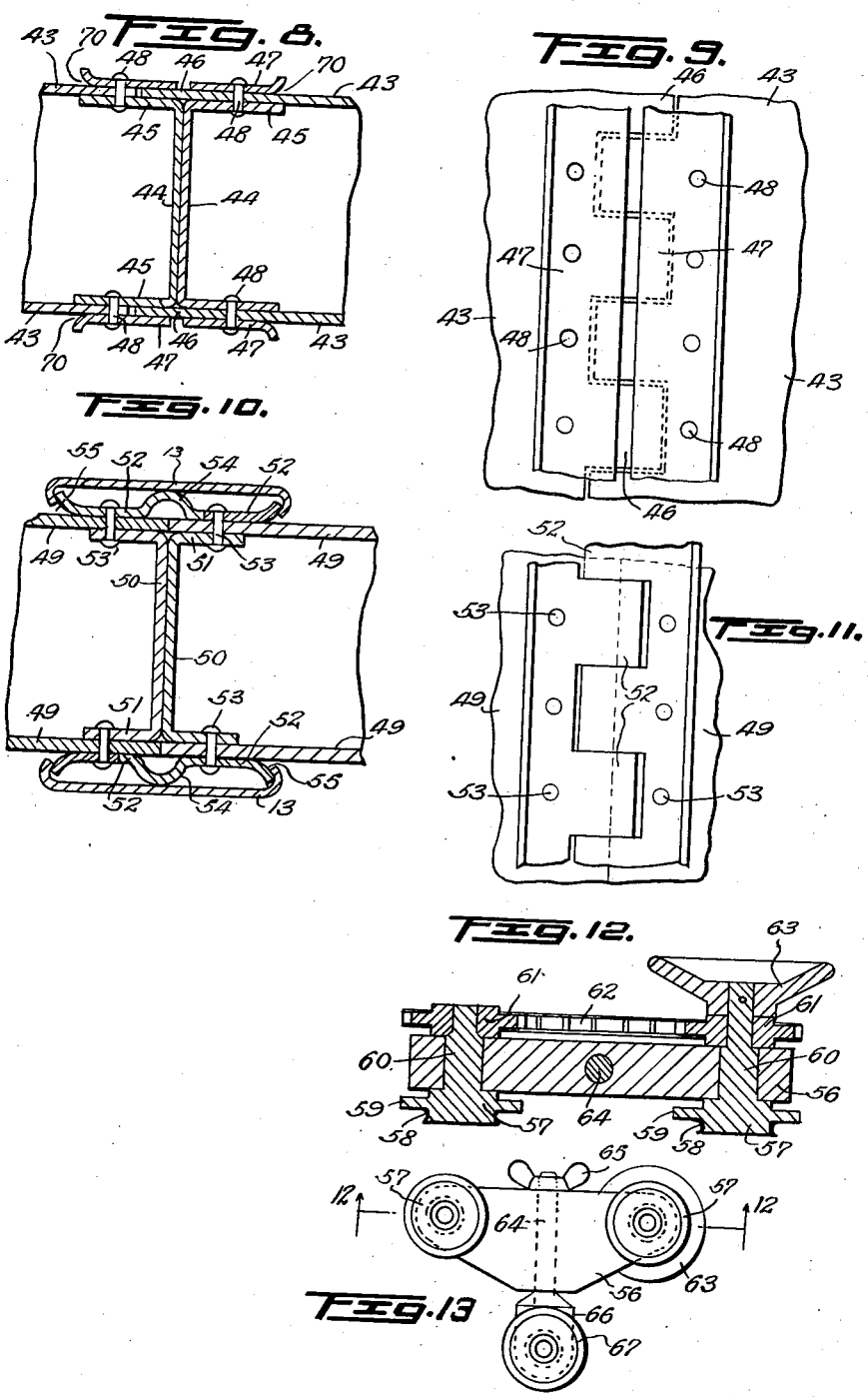

Patented Jan. 6, 1942

2,268,636

UNITED STATES PATENT OFFICE 2,268,636

MEANS FOR CONNECTING METAL SHEETS

Emil Becker, Munich, Germany

Application April 26, 1939, Serial No. 270,080
In Germany April 26, 1938

5 Claims. (Cl. 189—36)

The customary method of connecting together abutting slabs or plates, both solid and hollow, is to screw, bolt or rivet them together along their adjoining edges. The disadvantage of this method lies in the fact that the sheets forming the slabs, especially thin sheets, are considerably weakened by the holes thus formed and that the stresses which are distributed over the entire sheet are concentrated at the point of connection, that is at the screw or rivet holes, which constitute the weakest points. Reinforcements along the edges only partly overcome this disadvantage and make the joint considerably more expensive.

The invention consists in that the edges of the parts to be connected are provided with an undercut flange and that a strip of claw-like cross-section, that is of U-shape with inwardly bent flanges, fits over said flanges. The flange extends along the entire edge of the parts to be connected, with satisfactory stress transmitting ability. It is not only considerably lighter in weight than rivets or bolts and nuts, but it is especially adapted for connecting structures of comparatively thin and highly stressed sheet metal, because in cases like this the concentration of stresses at a few individual points is particularly disadvantageous, while this new method transmits the stresses evenly distributed along the edge to be connected.

For wall-like structures the connection may be so made that the flanges are arranged below the surface and that by applying a cover after the connection is completed, an entirely smooth surface may be obtained.

To prevent movement of connected slabs relative to each other in a direction at right angles to their planes, a locking strip may be inserted between the abutting walls of the structure, this strip carrying lugs along its edge which are alternately bent over the edge of abutting slabs.

In a similar way the slabs may be locked against movement in relation to each other in a direction along their edges by inserting a strip at one or both edges, the strip having lugs or teeth which engage in corresponding slots or holes in the edges of the plates forming the slabs.

For cellular structures from sheet metal the flanges may be formed by bending the marginal edges of the sheets of the structure over backwardly or they may be formed by extending the abutting side walls outwardly beyond the top of the slab and then bending over the extensions which results in a particularly strong construction, or they may be obtained by riveting or welding a separate strip along the edge of the top. This strip may then also contain the slots or teeth to prevent the longitudinal and/or lateral movement as described above.

The method of producing this new connection consists of sliding the connecting strip over the flanges especially if the seam to be connected is not very long, or by laying a strip over the flanges, whereby the strip has one edge already formed while the other edge is only bent up at right angles and is rolled under the flange by moving a set of special rollers along the edge to be connected, or a plain strip may be used and both edges rolled simultaneously.

On account of the simple way in which this invention may be produced and also on account of the lack of an accumulation of metal, this new connecting element may be removed by simply cutting the connecting strip in cases where it cannot be removed by sliding it off, without damaging the edges of the parts to be connected, so that the parts may be connected again by applying another connecting strip. This results in such a wide field of application that this method of connecting may also be used for non-metallic materials, such as wood and synthetic materials.

For an understanding of the invention and the manner in which the same is constructed, reference is to be had to the following description and accompanying drawings in which:

Figure 1 is a cross-section through two plate-like parts of, for instance, boiler plate or cast iron, which are connected together in accordance with this invention.

Figure 2 is a vertical cross-section through a cellular structure illustrating the manner in which the invention is applied to such structures.

Figure 3 is a vertical cross-section illustrating an alternative construction to that shown in Figure 2.

Figure 4 is a vertical cross-section illustrating a further modification.

Figure 5 is a vertical cross-section of a cellular structure wherein means is provided for preventing vertical movement of the slabs forming the structure relative to each other.

Figure 6 is a vertical cross-section through the slabs forming the cellular structure wherein means is provided for locking the slabs longitudinally relative to each other.

Figure 7 is a plan view of Figure 6 with the locking strip removed.

Figure 8 illustrates an alternative construction to that shown in Figure 6.

Figure 9 is a plan view of the construction shown in Figure 8.

Figure 10 illustrates a further alternative construction to that shown in Figures 6 and 8.

Figure 11 is a plan view of Figure 10 with the locking strip removed.

Figure 12 is a vertical sectional view of a tool for applying the locking strip to the flanges of the structures, taken on the line 12—12, Figure 13, and, Figure 13 is a reduced plan view of the tool shown in Figure 12.

Like characters of reference refer to like parts throughout the specification and drawings.

The structure shown in Figure 1 illustrates the invention in its simplest form. In this figure two slabs 10 and 11 are connected together in the following manner. The abutting edge of each slab is formed or provided with an undercut flange 12, the flange being undercut as shown at 12a. Each flange and its undercut portion extends along the full length of the abutting edges. It will be seen from the drawings that each slab has such a flange formed on opposite sides. The slabs are connected together by means of two connecting strips 13 located on opposite sides of the slab. Each connecting strip has claw-like flanges which fit into the undercut portions of the flanges 12. In the case of slabs of narrow width, the connecting strip may be slid over the flanges 12. However, a much firmer connection may be established by pre-forming one of the flanges on the connecting strip, placing the strip in position and then rolling the unformed flange into the undercut portion 12a of the flange 12 by means of a tool such as illustrated in Figures 12 and 13, to be more fully described.

In order to prevent lateral movement between the connected slabs 10 and 11, the abutting wall of one slab is formed with a tongue 14 which fits closely within a groove 14a formed in the abutting face of the other wall.

In Figure 2 I illustrate the manner in which my invention is applied to connecting slabs of cellular structure wherein each cellular slab comprises side walls 15 and end walls 16. Flanges 17 are formed by folding back end portions of the side walls 15 along the edges of the slabs to be abutted, and then turning the edges of the folded back portions away from the walls 15 to form the under-cut portions or grooves 18. The connecting strips 13 are applied in the same manner as previously stated in reference to the construction shown in Figure 1.

In Figure 3, which shows a modification of the construction illustrated in Figure 2, the abutting end walls 19 of the cellular slabs are slanted so that an individual slab may be readily removed from a series of such slabs forming a wall. The end portions 20 of the slab side walls 21 are recessed and the end walls 19 are formed with extensions 22 which are bent to over-lie the recessed portions 20 of the side walls 21. The edges of the flanges 22 are upturned to form under-cut portions or grooves 23. The connecting strips 13 are applied in the manner heretofore described. In this construction the outer faces of the strips 13 are substantially flush with the outer faces of the side walls 21.

In Figure 4 I show a construction wherein the end walls 24 of the cellular slabs are crowned and are narrower than the distance between the slab side walls 25. The crowned end walls 24 are connected to the side walls 25 by Z-shaped strips 26, one leg of each strip 26 being riveted to a side wall 25 and the other leg of the strip riveted to the turned-in end of an end wall 24. The edges of the portions of the Z-strips 26 which are riveted to the end walls 24 are formed with outwardly turned edges 27 that are bent backwardly to form grooves or under-cuts for the reception of the claw-like flanges of the strips 13. The strips 13 are inserted in place through the orifices provided between the pairs of Z-shaped strips 26, and after the strips 13 are applied such orifices are closed by plates 28 which carry spring strips 29 on their inner faces, such spring strips clipping underneath the sloping portions of the Z-strips 26.

The construction shown in Figure 5 is somewhat similar to that shown in Figure 3 but includes an additional means for retaining the two slabs against vertical movement relative to each other. In this construction the side walls 30 of the cellular slabs are secured to the end walls 31 of the slabs by forming the end walls 31 with turned-back flanges 32 that over-lie the outer faces of the side walls 30. A locking strip 33 is positioned between the end walls 31, such strip being of greater width than the width of the end walls 31 and formed with a plurality of slits along its edges so that the slitted edges of the strip can be bent back in the form of lugs 34 and 35 which alternately over-lie the flanges 32 of the end walls, the lugs 34 being bent over one flange while the lugs 35 are bent over the other flange. The edges of the flanges 32 are bent outwardly to form grooves or under-cuts for the reception of the claw-like flanges of the strips 13.

Figures 6 and 7 illustrate the provision of means for locking cellular slabs against longitudinal movement relative to each other. In Figure 6 I show two cellular slabs formed of side walls 36 and end walls 37, the end walls being formed with flanges 38 which under-lie the inner faces of the side walls 36. In order to retain the slabs against longitudinal movement relative to each other, I furnish pairs of strips 39 which over-lie the outer faces of the slab side walls 36 in the vicinity of the abutting ends of the slabs. The opposite edges of the strips 39 are of castellated form as illustrated in Figure 7 and the strips 39, side walls 36 and flanges 38 are retained in their assembly by rivets 40. I also furnish arched strips 41 which are positioned between the strips 39, and are also formed with castellated edges which interlock with the castellated edges of the strips 39. After the slabs are positioned in their abutting relationship, the strips 41 are dropped into place between the strips 39. The outer edges of the strips 39 are up-turned to form under-cuts or grooves 42 for the reception of the claw-like flanges of the strips 13. It will be appreciated that through the provision of the strips 41 interlocking with the strips 39 the slabs are retained against sliding movement relative to each other and that also the arch in the strip 41 in bearing against the strip 13 retains such strip 41 in its adjusted position.

In Figures 8 and 9 I show another modification of my invention wherein the slabs are formed with side walls 43 and end walls 44, the end walls being formed with flanges 45 which under-lie the inner faces of the side walls 43. In this construction the ends of the side walls 43 project outwardly beyond the outer faces of the end walls 44. The outer edges of the projecting end portions 46 of the side walls 43 are of castellated form and interlock as illustrated in Figure 9. Over-lying the castellated strips 46 I furnish pairs of strips 47, the flanges 45, side walls 43 and strips 47 being retained in their assembly by suitably positioned rivets 48. The outer edges of the strips 47 are up-turned to form under-cuts or grooves 70 for the reception of the claw-like edges of the strips 13. In Figures 8 and 9 the strip 13 is not shown applied to the assembly.

In Figures 10 and 11 I show a construction which somewhat closely follows the pattern of the construction shown in Figures 6 and 7. In the construction illustrated the slabs are formed with side walls 49 and end walls 50. The end walls 50 are furnished with in-turned flanges 51 which underlie the inner face of the side walls 49. In the vicinity of the end portions of the outer faces of the side walls 49 I furnish strips 52, the flanges 51, side walls 49 and strips 52 being retained in assembly by rivets 53. The abutting edges of the strips 52 are of interlocking castellated form, as shown in Figure 11. Upon reference to Figure 10 it will be seen that the interlocking castellated portions of the strips 52 are formed with outward bows 54 which provide central supports for the locking strips 13 after they are applied. The outer edges of the strips 52 are up-turned to form undercuts or grooves 55 for the reception of the claw-like edges of the strips 13. Figure 11 shows the interlocking strips 52 before the locking strip 13 is applied.

Figures 12 and 13 illustrate a tool such as may be used for applying the connecting strips 13. This tool consists of a relatively thick and strong plate 56 of substantially triangular form and supporting two rollers 57 positioned in the vicinity of its corners. The rollers are formed with peripheral grooves 58 and flanges 59. The flanges 59 are provided to rest upon the top of the strip 13 while the grooves 58 roll along and engage one claw-like edge of the strip 13. The rollers 57 are carried upon suitable spindles 60 which project through the plate 56, the spindles carrying sprocket wheels 61 on their protruding ends. The sprocket wheels 61 are connected by a chain 62. One of the spindles 60 projects outwardly of its sprocket wheel and carries a hand-wheel 63. The plate 56 has a transverse orifice therethrough containing a spindle 64. One end of the spindle is threaded to carry a wing nut 65 and the other end carries a boss 66 which in turn carries a forming pulley 67 of similar construction to the pulleys 57 and also positioned in the same plane.

When the tool is applied to a strip 13 to roll such strip into its slab locking position, the rollers 57 are positioned in engagement with the claw-like edge of the strip 13 which has been already formed and the roller 67 is brought into engagement with the other edge of the strip which is to be formed. The wing nut 65 is adjusted to move the spindle 64 and roller 67 towards the rollers 57 and after this adjustment has been made, the hand-wheel 63 is turned so that the rollers 57 rotate and roll along the formed edge of the strip 13, which movement bends the edge of the strip 13 engaged by the roller 67 into its claw-like gripping position. It is to be understood that the strip 13 before it is applied is bent to the finished claw-like shape along one edge while its other edge is only bent downwardly substantially at right angles to the strip.

Upon reference to Figures 2, 3 and 5 it will be seen that I have not shown any means for permanently connecting the side and end walls of the cellular slabs together, such as the rivets I have shown in the other figures of the drawings, but it is to be understood that the walls of the cellular slabs can be connected together in any suitable manner, such as by rivets or spot welding. My method of joining slabs results in an exceptionally strong joint being achieved, especially as the strip 13 is rolled into place under tension. Although I have shown in Figures 12 and 13 a comparatively simple tool for forming a claw-like edge on a connecting strip being positioned in place, it will be appreciated that the formation and application of the strip can be carried out in a diversity of ways, and that suitable rolling tools can be actuated either by hand or under power depending upon the thickness of metal in the connecting strip.

What I claim as my invention is:

1. In a structure formed of a plurality of cellular slabs and in which each slab comprises side walls of sheet material and end walls of sheet material, means for connecting abutting slabs comprising the provision of strips of sheet material resting on and extending across and secured to the side walls of the slabs in substantially parallel relation to and in the vicinity of the end walls of the slabs, the opposed edges of said strips of sheet material being of castellated form and interlocking with each other to retain the abutting slabs against longitudinal movement relative to each other, the edges of the strips remote from the slab end walls being turned outwardly from the outer faces of the side walls to form grooves of V-shaped cross-section, a connecting strip overlying abutting slabs, and claw-like edges formed on the connecting strip and projecting into the grooves to engage the up-turned edges of the strips of sheet material.

2. In a structure formed of a plurality of cellular slabs and in which each slab comprises side walls of sheet material and end walls of sheet material, means for connecting abutting slabs comprising the provision of strips of sheet material resting on and extending across and secured to the side walls of the slabs in substantially parallel relation to and in the vicinity of the end walls of the slabs, said strips projecting from each slab to overlie an adjacent slab and also interlocking with each other and retaining the slabs against longitudinal movement relative to each other, the edges of the strips remote from the slab end walls being turned outwardly from the outer faces of the side walls to form grooves of V-shaped cross-section, a connecting strip overlying abutting slabs, and claw-like edges formed on the connecting strip and projecting into the grooves to engage the up-turned edges of the strips of sheet material.

3. In a structure formed of a plurality of cellular slabs and in which each slab comprises side walls of sheet material and end walls of sheet material, means for connecting abutting slabs comprising the provision of arched strips of sheet material resting on and extending across and secured to the side walls of the slabs in substantially parallel relation to and in the vicinity of the end walls of the slabs, said arched strips projecting from each slab to overlie an adjacent slab, the arches in the strips arching across the abutting edges of the slabs, said strips also retaining the slabs against longitudinal movement relative to each other, the edges of the arched strips remote from the slab end walls being turned outwardly from the outer faces of the side walls to form grooves of V-shaped cross-section, a connecting strip overlying abutting slabs, and claw-like edges formed on the connecting strip and projecting into the grooves to engage the up-turned edges of the strips of sheet material.

4. In a structure formed of a plurality of cellular slabs and in which each slab comprises side walls of sheet material and end walls of sheet material, means for connecting abutting slabs comprising the provision of arched strips of sheet material resting on and extending across and secured to the side walls of the slabs in substantially parallel relation to and in the vicinity of the end walls of the slabs, said arched strips projecting from each slab to overlie an adjacent slab, the arches in the strips arching across the abutting edges of the slabs, said arched strips also retaining the slabs against longitudinal movement relative to each other, the edges of the arched strips remote from the slab end walls being turned outwardly from the outer faces of the side walls to form grooves of V-shaped cross-section, a connecting strip overlying the abutting slabs and resting upon the arched strips, and claw-like edges formed on the connecting strip and projecting into the grooves to engage the up-turned edges of the strips of sheet material.

5. In a structure formed of a plurality of cellular slabs and in which each slab comprises side walls of sheet material and end walls of sheet material, means for connecting abutting slabs comprising the provision of arched strips of sheet material resting on and extending across and secured to the side walls of the slab in substantially parallel relation to and in the vicinity of the end walls of the slabs, the arched strips projecting from each slab to overlie an adjacent slab, the arches in the strips arching across the abutting edges of the slabs, the edges of the arched strips being of castellated form and interlocking with each other whereby the slabs are retained against longitudinal movement relative to each other, the edges of the arched strips remote from the slab end walls being turned outwardly from the outer faces of the side walls to form grooves of V-shaped cross-section, a connecting strip overlying the abutting slabs and resting upon the arched strips, and claw-like edges formed on the connecting strip and projecting into the grooves to engage the up-turned edges of the strips of sheet material.

EMIL BECKER.